United States Patent
Dorai et al.

(10) Patent No.: US 9,866,760 B2
(45) Date of Patent: *Jan. 9, 2018

(54) MULTI-MODE LED ILLUMINATION SYSTEM

(71) Applicant: GOOGLE INC., Mountain View, CA (US)

(72) Inventors: Arvind Dorai, San Francisco, CA (US); Anders Nelson, San Francisco, CA (US); Brian Jonathan Conner, San Jose, CA (US)

(73) Assignee: GOOGLE INC., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/403,132

(22) Filed: Jan. 10, 2017

(65) Prior Publication Data
US 2017/0126949 A1    May 4, 2017

Related U.S. Application Data

(63) Continuation of application No. 14/723,276, filed on May 27, 2015, now Pat. No. 9,544,485.

(51) Int. Cl.
*H04N 5/235* (2006.01)
*H04N 5/33* (2006.01)
(Continued)

(52) U.S. Cl.
CPC ........... *H04N 5/2354* (2013.01); *G03B 15/05* (2013.01); *H04N 5/2256* (2013.01);
(Continued)

(58) Field of Classification Search
CPC .... H04N 5/2256; H04N 5/2354; G03B 15/03; G03B 15/05; H05B 33/083
See application file for complete search history.

(56) References Cited

U.S. PATENT DOCUMENTS 2,997,935 A    8/1961    Scheffold
3,782,260 A    1/1974    Ettischer et al.
(Continued)

OTHER PUBLICATIONS

0308 Brand USB 2.0 HD Night Vision Webcam Web Cam Camera Webcamera With Microphone Sucker Stand for PC Computer Laptop Notebook, Dec. 18, 2015, 13 pgs.
(Continued)

*Primary Examiner* — Daniel M Pasiewicz
(74) *Attorney, Agent, or Firm* — Morgan, Lewis & Bockius LLP

(57) ABSTRACT

This application discloses a lighting emitting diode (LED) illumination system that operates at least in a boost mode and a bypass mode. The LED illumination system includes a plurality of LEDs and bypass elements. Each bypass element is coupled in parallel with one or more LEDs, and configured to bypass them selectively in the bypass mode. A boost converter is configured to drive the LEDs. The boost converter includes a boost controller that is configured to enable the boost mode in response to a boost enable signal. In the boost mode, the boost controller is electrically coupled to control the boost converter to drive the LEDs by a boosted drive voltage, and in the bypass mode, the boost controller is deactivated to allow the boost converter to drive a subset of the LEDs by a regular drive voltage that is substantially lower than the boosted drive voltage.

20 Claims, 6 Drawing Sheets

(51) Int. Cl.
*H04N 5/232* (2006.01)
*H04N 5/225* (2006.01)
*G03B 15/05* (2006.01)
*H05B 33/08* (2006.01)

(52) U.S. Cl.
CPC ........... *H04N 5/23245* (2013.01); *H04N 5/33* (2013.01); *H05B 33/083* (2013.01); *H05B 33/0818* (2013.01); *H05B 33/0845* (2013.01)

(56) References Cited

U.S. PATENT DOCUMENTS

| | | | |
|---|---|---|---|
| D349,914 S | 8/1994 | Usui | |
| D357,267 S | 4/1995 | Yotsuya | |
| D372,490 S | 8/1996 | Sheffield et al. | |
| 5,604,534 A | 2/1997 | Hedges et al. | |
| D385,571 S | 10/1997 | Abrams | |
| 5,862,428 A | 1/1999 | An | |
| 5,963,253 A | 10/1999 | Dwyer | |
| 5,978,028 A | 11/1999 | Yamane | |
| 6,088,470 A | 7/2000 | Camus et al. | |
| D429,269 S | 8/2000 | Renkis | |
| D429,743 S | 8/2000 | Renkis | |
| 6,141,052 A | 10/2000 | Fukumitsu | |
| 6,147,701 A | 11/2000 | Tamura et al. | |
| D442,202 S | 5/2001 | Pfeifer | |
| D445,123 S | 7/2001 | Shen | |
| 6,268,882 B1 | 7/2001 | Elberbaum | |
| D446,534 S | 8/2001 | Zimmer | |
| D447,758 S | 9/2001 | Lin et al. | |
| D449,630 S | 10/2001 | Rak et al. | |
| D452,259 S | 12/2001 | Choi | |
| 6,357,936 B1 | 3/2002 | Elberbaum | |
| D455,164 S | 4/2002 | Tsang et al. | |
| 6,462,781 B1 | 10/2002 | Arnold | |
| D467,952 S | 12/2002 | Nakamura | |
| D469,775 S | 2/2003 | Bradley | |
| D470,874 S | 2/2003 | Chiu | |
| D470,875 S | 2/2003 | Liao | |
| 6,515,275 B1 | 2/2003 | Hunter et al. | |
| 6,634,804 B1 | 10/2003 | Toste et al. | |
| 6,650,694 B1 | 11/2003 | Brown et al. | |
| 6,678,001 B1 | 1/2004 | Elberbaum | |
| 6,714,236 B1 | 3/2004 | Wada | |
| 6,727,954 B1 | 4/2004 | Okada et al. | |
| D489,388 S | 5/2004 | Saito et al. | |
| 6,741,286 B2 * | 5/2004 | Meek | H04N 5/2252 307/35 |
| 6,762,790 B1 | 7/2004 | Matko et al. | |
| D511,352 S | 11/2005 | Oliver et al. | |
| 7,066,664 B1 | 6/2006 | Sitoh et al. | |
| 7,076,162 B2 * | 7/2006 | Yamashita | G03B 15/05 348/371 |
| D527,755 S | 9/2006 | Wu | |
| 7,151,565 B1 | 12/2006 | Wada | |
| D534,938 S | 1/2007 | Beasley et al. | |
| D537,097 S | 2/2007 | Freeman | |
| D542,320 S | 5/2007 | Cheng | |
| D552,649 S | 10/2007 | Logan et al. | |
| D552,659 S | 10/2007 | Stephens et al. | |
| D555,692 S | 11/2007 | Liu et al. | |
| 7,290,740 B2 | 11/2007 | Joy et al. | |
| D558,250 S | 12/2007 | Hsia | |
| D563,446 S | 3/2008 | Stephens et al. | |
| D575,316 S | 8/2008 | Liu et al. | |
| 7,443,446 B2 | 10/2008 | Seo | |
| 7,552,340 B2 | 6/2009 | Ooi et al. | |
| 7,586,537 B2 | 9/2009 | Konishi et al. | |
| D606,105 S | 12/2009 | Hinkel | |
| 7,646,425 B2 | 1/2010 | Bohaker et al. | |
| D610,601 S | 2/2010 | Melder | |
| D614,223 S | 4/2010 | Kim et al. | |
| D627,815 S | 11/2010 | Oba | |
| D628,223 S | 11/2010 | Kao | |
| 7,930,369 B2 | 4/2011 | Marriott et al. | |
| D638,461 S | 5/2011 | Kim et al. | |
| 7,986,369 B1 | 7/2011 | Burns | |
| D648,766 S | 11/2011 | Chen | |
| D651,229 S | 12/2011 | Tan et al. | |
| D651,230 S | 12/2011 | Tan et al. | |
| 8,072,536 B1 | 12/2011 | Campbell | |
| D651,633 S | 1/2012 | Park et al. | |
| 8,139,122 B2 | 3/2012 | Rolston | |
| D657,410 S | 4/2012 | Helaoui et al. | |
| 8,165,146 B1 | 4/2012 | Melick et al. | |
| 8,174,972 B2 | 5/2012 | Cernius et al. | |
| 8,359,622 B1 | 1/2013 | Everson et al. | |
| D678,929 S | 3/2013 | Hancock | |
| 8,402,145 B2 | 3/2013 | Holden et al. | |
| 8,432,485 B1 | 4/2013 | Martinez et al. | |
| D687,085 S | 7/2013 | Manson | |
| 8,504,707 B2 | 8/2013 | Toebes et al. | |
| D694,305 S | 11/2013 | Katori et al. | |
| D697,119 S | 1/2014 | Park et al. | |
| 8,625,024 B2 | 1/2014 | Hsu | |
| D700,232 S | 2/2014 | Ramsay | |
| D719,205 S | 12/2014 | Matsumoto | |
| D729,296 S | 5/2015 | Shelton | |
| D730,422 S | 5/2015 | Kim et al. | |
| 9,071,740 B1 | 6/2015 | Duffy et al. | |
| D733,781 S | 7/2015 | Chen | |
| D734,801 S | 7/2015 | Yang | |
| 9,102,055 B1 | 8/2015 | Konolige et al. | |
| D740,871 S | 10/2015 | Moon et al. | |
| D742,954 S | 11/2015 | Simonelli et al. | |
| D743,465 S | 11/2015 | Aglassinger et al. | |
| D745,916 S | 12/2015 | Oh | |
| D746,350 S | 12/2015 | Li | |
| D748,709 S | 2/2016 | Jeong | |
| D755,880 S | 5/2016 | Luo et al. | |
| 9,330,307 B2 | 5/2016 | Litvak et al. | |
| 9,386,230 B1 | 7/2016 | Duran et al. | |
| 9,544,485 B2 * | 1/2017 | Conner | H05B 33/0833 |
| 2001/0015760 A1 | 8/2001 | Fellegara et al. | |
| 2002/0003575 A1 | 1/2002 | Marchese | |
| 2002/0056794 A1 | 5/2002 | Ibrahim | |
| 2002/0107591 A1 | 8/2002 | Gabai et al. | |
| 2002/0141418 A1 | 10/2002 | Ben-Dor et al. | |
| 2002/0186317 A1 | 12/2002 | Kayanuma | |
| 2002/0191082 A1 | 12/2002 | Fujino et al. | |
| 2003/0164881 A1 * | 9/2003 | Ohe | H04M 1/0266 348/207.99 |
| 2003/0169354 A1 | 9/2003 | Aotsuka | |
| 2003/0193409 A1 | 10/2003 | Crank | |
| 2003/0216151 A1 * | 11/2003 | Kitano | H04N 1/00307 455/556.1 |
| 2004/0132489 A1 | 7/2004 | Ryley et al. | |
| 2004/0211868 A1 | 10/2004 | Holmes et al. | |
| 2004/0246341 A1 | 12/2004 | Lee et al. | |
| 2004/0247203 A1 | 12/2004 | Dell'Eva | |
| 2005/0062720 A1 | 3/2005 | Rotzoll et al. | |
| 2005/0128336 A1 | 6/2005 | Toledano et al. | |
| 2005/0149213 A1 | 7/2005 | Guzak et al. | |
| 2005/0151042 A1 | 7/2005 | Watson | |
| 2005/0200751 A1 | 9/2005 | Weaver | |
| 2005/0212958 A1 | 9/2005 | Su et al. | |
| 2005/0227217 A1 | 10/2005 | Wilson | |
| 2005/0230583 A1 | 10/2005 | Wu | |
| 2005/0237425 A1 | 10/2005 | Lee et al. | |
| 2005/0243022 A1 * | 11/2005 | Negru | H05B 33/0857 345/46 |
| 2005/0243199 A1 | 11/2005 | Bohaker et al. | |
| 2005/0275723 A1 | 12/2005 | Sablak et al. | |
| 2006/0017842 A1 | 1/2006 | Jun | |
| 2006/0024046 A1 | 2/2006 | Jones | |
| 2006/0086871 A1 | 4/2006 | Joseph et al. | |
| 2006/0109375 A1 | 5/2006 | Ho et al. | |
| 2006/0109613 A1 | 5/2006 | Chen | |
| 2006/0123129 A1 | 6/2006 | Toebes et al. | |
| 2006/0123166 A1 | 6/2006 | Toebes et al. | |
| 2006/0210259 A1 | 9/2006 | Matsumoto | |
| 2006/0238707 A1 | 10/2006 | Elvesjo et al. | |
| 2006/0244583 A1 | 11/2006 | Kawada | |
| 2006/0262194 A1 | 11/2006 | Swain | |

(56) References Cited

U.S. PATENT DOCUMENTS

| | | |
|---|---|---|
| 2006/0282866 A1 | 12/2006 | Kuo |
| 2007/0001087 A1 | 1/2007 | Shyu et al. |
| 2007/0011375 A1 | 1/2007 | Kumar |
| 2007/0036539 A1 | 2/2007 | Martinez et al. |
| 2007/0083791 A1 | 4/2007 | Panesar et al. |
| 2007/0222888 A1 | 9/2007 | Xiao et al. |
| 2008/0001547 A1* | 1/2008 | Negru .............. H02J 7/0065 315/189 |
| 2008/0005432 A1 | 1/2008 | Kagawa |
| 2008/0056709 A1 | 3/2008 | Huang et al. |
| 2008/0074535 A1 | 3/2008 | Ohsuga |
| 2008/0151052 A1 | 6/2008 | Erel et al. |
| 2008/0152218 A1 | 6/2008 | Okada |
| 2008/0186150 A1 | 8/2008 | Kao |
| 2008/0189352 A1 | 8/2008 | Mitchell et al. |
| 2008/0231699 A1 | 9/2008 | Konishi et al. |
| 2008/0291260 A1 | 11/2008 | Dignan et al. |
| 2008/0309765 A1 | 12/2008 | Dayan et al. |
| 2009/0019187 A1 | 1/2009 | Okuma |
| 2009/0027570 A1 | 1/2009 | Fujinawa |
| 2009/0069633 A1* | 3/2009 | Orihara ............ A61B 1/0676 600/163 |
| 2009/0102715 A1 | 4/2009 | Lou et al. |
| 2009/0141918 A1 | 6/2009 | Chris et al. |
| 2009/0141939 A1 | 6/2009 | Chambers et al. |
| 2009/0195655 A1 | 8/2009 | Pandey |
| 2009/0245268 A1 | 10/2009 | Pugliese, IV |
| 2009/0248918 A1 | 10/2009 | Diab et al. |
| 2009/0289921 A1 | 11/2009 | Mickelson et al. |
| 2009/0296735 A1 | 12/2009 | Cernius et al. |
| 2009/0309969 A1 | 12/2009 | Wendler |
| 2010/0026811 A1 | 2/2010 | Palmer |
| 2010/0039253 A1 | 2/2010 | Zang |
| 2010/0076600 A1 | 3/2010 | Cross et al. |
| 2010/0085749 A1 | 4/2010 | Bezgachev |
| 2010/0109878 A1 | 5/2010 | Desrosiers |
| 2010/0180012 A1 | 7/2010 | Heo et al. |
| 2010/0199157 A1 | 8/2010 | Takaoka et al. |
| 2010/0271503 A1 | 10/2010 | Safaee-Rad et al. |
| 2010/0306399 A1 | 12/2010 | Khosravi et al. |
| 2010/0314508 A1 | 12/2010 | Bevirt et al. |
| 2010/0328475 A1 | 12/2010 | Thomas et al. |
| 2010/0330843 A1 | 12/2010 | Gao et al. |
| 2011/0007159 A1 | 1/2011 | Camp et al. |
| 2011/0102438 A1 | 5/2011 | Mathe et al. |
| 2011/0102588 A1 | 5/2011 | Trundle et al. |
| 2011/0134313 A1 | 6/2011 | Kato |
| 2011/0158637 A1 | 6/2011 | Jung |
| 2011/0161076 A1 | 6/2011 | Davis et al. |
| 2011/0193964 A1 | 8/2011 | McLeod |
| 2011/0193967 A1 | 8/2011 | Matsumoto et al. |
| 2011/0205965 A1 | 8/2011 | Sprigg et al. |
| 2011/0231903 A1 | 9/2011 | Springer et al. |
| 2011/0234803 A1 | 9/2011 | Nakajima et al. |
| 2011/0255289 A1 | 10/2011 | Krah |
| 2011/0267492 A1 | 11/2011 | Prentice et al. |
| 2011/0285813 A1 | 11/2011 | Girdzijauskas et al. |
| 2011/0293137 A1 | 12/2011 | Gurman et al. |
| 2011/0299728 A1 | 12/2011 | Markovic et al. |
| 2012/0081009 A1* | 4/2012 | Shteynberg ........ H05B 33/083 315/122 |
| 2012/0105632 A1 | 5/2012 | Renkis |
| 2012/0106037 A1 | 5/2012 | Diebel et al. |
| 2012/0127270 A1 | 5/2012 | Zhang et al. |
| 2012/0140068 A1 | 6/2012 | Monroe et al. |
| 2012/0162416 A1 | 6/2012 | Su et al. |
| 2012/0194650 A1 | 8/2012 | Izadi et al. |
| 2012/0236373 A1 | 9/2012 | Oyama |
| 2012/0246359 A1 | 9/2012 | Scragg, Jr. et al. |
| 2012/0262575 A1 | 10/2012 | Champagne et al. |
| 2012/0263450 A1 | 10/2012 | Totani |
| 2013/0053657 A1 | 2/2013 | Ziarno et al. |
| 2013/0156260 A1 | 6/2013 | Craig |
| 2013/0162629 A1 | 6/2013 | Huang et al. |
| 2013/0314544 A1 | 11/2013 | Ban |
| 2013/0321564 A1 | 12/2013 | Smith et al. |
| 2013/0342653 A1 | 12/2013 | McCloskey et al. |
| 2014/0032796 A1 | 1/2014 | Krause |
| 2014/0047143 A1 | 2/2014 | Bateman et al. |
| 2014/0049609 A1 | 2/2014 | Wilson et al. |
| 2014/0119604 A1 | 5/2014 | Mai et al. |
| 2014/0168421 A1 | 6/2014 | Xu et al. |
| 2014/0241387 A1* | 8/2014 | Ortiz .................... H05B 33/083 372/38.02 |
| 2014/0270387 A1 | 9/2014 | Hoof et al. |
| 2014/0333726 A1 | 11/2014 | Tokui et al. |
| 2014/0375635 A1 | 12/2014 | Johnson et al. |
| 2015/0052029 A1 | 2/2015 | Wu et al. |
| 2015/0120389 A1 | 4/2015 | Zhang et al. |
| 2015/0154467 A1 | 6/2015 | Feng et al. |
| 2015/0170371 A1 | 6/2015 | Muninder et al. |
| 2015/0181198 A1 | 6/2015 | Baele et al. |
| 2015/0228114 A1 | 8/2015 | Shapira et al. |
| 2016/0012588 A1 | 1/2016 | Taguchi et al. |
| 2016/0022181 A1 | 1/2016 | Valsan et al. |
| 2016/0029102 A1 | 1/2016 | Daily |
| 2016/0094763 A1 | 3/2016 | Patel |
| 2016/0094829 A1 | 3/2016 | Georgiev et al. |
| 2016/0142681 A1 | 5/2016 | Yu et al. |
| 2016/0261829 A1 | 9/2016 | Olsson |

OTHER PUBLICATIONS

720p TF Card IP Wireless Camera Indoor Built-In Microphone Support Two Way Intercom for Smart Home Life and Unique PIR Alarm, Dec. 18, 2015, 3 pgs.

Adipranata, Fast method for multiple human face segmentation in color image, 2008 Second Int'l Conference on Future Generation Communcation and Networking, IEEE, 2008, 4 pgs.

Buy Svb Ladybird Tripod Webcam 4 Mega Pixel—4 Megapixel Web Cam Online, Best Prices in India: Rediff Shopping, Dec. 16, 2015, 3 pgs.

Drivers—Video Cam: Download Drivers for (Genius VideoCAM NB) Visual/Video Camera, Computer Question Help, Jul. 3, 2008, 2 pgs.

Ebay, Belkin F7D7601AU, Net Cam IP WIFI Baby Pet Monitor Camera Security Night Vision, Dec. 15, 2015, 5 pgs.

Ebay, Lot of 2 USB WebCam Web Cam Camera Logitech Quickcam HP Hewlett Packard, Dec. 16, 2015, 3 pgs.

Ebay, Motorola, MBP421 Digital Video & Sound Rechargeable Baby Monitor 1.8" LCD Screen, Dec. 15, 2015, 5 pgs.

Ebay, New Smallest Mini Camera Camcorder Video Recorder DVR Spy Hidden Pinhole Web Cam, Dec. 2, 2015, 4 pgs.

FabulaTech, What is USB for Remote Desktop, Dec. 12, 2011, 2 pgs, http://web.archive.org/web/20111212070644/http://www.usb-over-network.com/usb-for-remote-desktop.html.

FabulaTech, What is USB over Network, Dec. 17, 2011, 2 pgs, http://web.archive.org/web/20111217080253/http://www.usb-over-network.com/usb-over-network.html.

Goods in Stock PC Camera USB Plug and Play Free Driver Digital Webcam Stand Web Camera, Dec. 18, 2015, 12 pgs.

Hampapur, Smart surveillance: applications, technologies and implications, Information Communications and Signal Processing 2, 2003, pp. 1133-1138.

Heo, Fusion of visual and thermal face recognition techniques: A comparative study. Univ. of Tennessee, Knoxville, TN, 2003, 75 pgs.

Input Devices on Pintrest, Computers, Mice and Apples, Tanna Darty, Dec. 15, 2015, 1 pg.

Ion Camera, The Home Pro Wi-Fi Wireless Cloud Video Monitoring Security Camera (Black): Camera & Photo, Dec. 15, 2015, 6 pgs.

Joel Johnson, Glowdoodle Turns Your Crappy Webcam in a Crappier Webcam (in a good way), webcam—Boing Boing, Dec. 16, 2015, 8 pgs.

John Lewis, Samsung SEB-1019RW Add-On Night Vision Baby Monitor Camera, Dec. 15, 2015, 2 pgs.

KYO-TUX, IconArchive, Device WebCam Icon, Phuzion Iconset, Jun. 8, 2010, 3 pgs.

(56) References Cited

OTHER PUBLICATIONS

Linksys Wireless-N Internet Home Monitoring Camera: Home Security Systems: Camera & Photo, Amazon.com, Dec. 15, 2015, 7 pgs.
Logi Circle: Portable Home Surveillance Camera from Logitech (video), AppleApple.Top World News, Feb. 10, 2015, 5 pgs.
Mini Universal Tripod Stand for Digital Camera and Webcam A33—in Tripods from Consumer Electronics on Aliexpress.com, Alibaba Group, Store: Angel One-Stop Shopping Center, Dec. 16, 2015, 3 pgs.
Parent, Android USB Port Forwarding, Dec. 26, 2011, 7 pgs, http://www.codeproject.com/Articles/191930/Android-Usb-Port-Forwarding.
Restore.Solutions, Numus Software, USB/VID, Syntek Web Cam Device Drivers, Dec. 12, 2015, 10 pgs.
Silberman, Indoor Segmentation and Support Ingerence from RGBD Images, Computer Vision—ECCV 2012, Springer Berlin Heidelbert, Oct. 2012, pp. 746-780.
SIV Al-Ball Very Small Hidden IP Network Camera Battery Powered Wireless IP Camera, Alibaba.com, 1999-2015, 7 pgs.
TechAllianz, How to Pick The Right Webcam, Satyakam, Jan. 22, 2013, 4 pgs.
TREK Ai-Ball Mini WiFi Spy Cam IP Wireless Camera for Iphone / Android /Ipad, Tmart, www.tmart.com, Dec. 18, 2015, 6 pgs.
Tripod Support for a QuickCam (or other webcam), Instructables, 2015, 3 pgs.
USB/IP Project, USB Request Over IP Network, Dec. 27, 2011, 5 pgs, http://web.archive.org/web/20111227171215/http://usbip.sourceforge.net/.
Web Camera 6 Stock Photo, Dreamstime, Dec. 16, 2015, 2 pgs.

\* cited by examiner

MULTI-MODE LED ILLUMINATION SYSTEM

RELATED APPLICATIONS

This application is a continuation of U.S. patent application Ser. No. 14/723,276, filed May 27, 2015, now U.S. Pat. No. 9,544,485, which is incorporated by reference herein in its entirety.

TECHNICAL FIELD

This application relates generally to semiconductor devices and circuits, including but not limited to methods and systems for driving light emitting devices for illumination at two or more operational modes associated with different device configurations.

BACKGROUND

Light emitting diodes (LEDs) are applied to provide a wide variety of illumination solutions, e.g., environmental lighting and backlight in mobile devices, because they offer advantages on energy consumption, lifetime, physical robustness, size and switching rate. The LEDs are electrically coupled to a certain configuration (e.g., a string or an array) to enable a desirable illumination level. Oftentimes, the LEDs are driven by an enhanced LED voltage that is raised from a regular power supply voltage by a boost type voltage regulator. The enhanced LED voltage is specifically determined according to the configuration and operation voltages of the LEDs. This boost type voltage regulator is implemented as a switch mode power supply (SMPS). When its duty cycle varies, the SMPS allows the enhanced LED voltage to be modulated within a voltage range thereof, thereby enabling the dimming effect on illumination delivered by the LEDs.

However, the boost type voltage regulator merely allows a limited voltage variation for the enhanced LED voltage, and cannot be used to drive the LEDs and provide a desirable illumination level when the coupling configuration of the LEDs varies (e.g., the number of the LEDs coupled within a string or array increases or decreases). For example, when a subset of LEDs are decoupled from a LED string, the enhanced LED voltage has to be reduced by one or more diode junction voltages, which could not be provided by the small voltage variation of the enhanced LED voltage. In this situation, the voltage regulator would fail to drive the LEDs having the new coupling configuration, because the enhanced LED voltage would overdrive and damage the LEDs. It would be beneficial to have a more flexible and tolerant LED driver than the current practice.

SUMMARY

Accordingly, there is a need for driving a plurality of LEDs that has more than one coupling configuration in association with different operation modes (e.g., a boost mode and a bypass mode). Specifically, such LEDs are driven by a boost voltage converter that provides a drive voltage according to each of the more than one coupling configuration. This LED driving method optionally complements or replaces conventional methods of using a single drive voltage with a limited voltage variation to enable dimmable LED illumination by a specific LED coupling configuration.

In accordance with one aspect of this application, a LED illumination system operates in a boost mode and a bypass mode. The LED illumination system includes a plurality of LEDs, a plurality of bypass elements, a boost converter, a first current sink and a second current sink. The plurality of LEDs is coupled in series to form a LED string. Each bypass element is coupled in parallel with a respective group of one or more of the LEDs, and configured to bypass selectively the respective group of LEDs in the bypass mode. The boost converter is coupled to the plurality of LEDs, and configured to generate a drive voltage to drive the plurality of LEDs. The boost converter includes a boost controller that is configured to enable the boost mode in response to a boost enable signal. The first and second current sinks are coupled to the plurality of LEDs, and configured to provide two drive currents to drive the LEDs in the boost mode and the bypass mode, respectively. In the boost mode, the boost controller is electrically coupled to control the boost converter to drive the LED string by a boosted drive voltage. Alternatively, in the bypass mode, the boost controller is deactivated to allow the boost converter to drive a subset of the plurality of LEDs by a regular drive voltage that is substantially lower than the boosted drive voltage.

In accordance with another aspect of this application, a camera device operates in two or more modes. The camera device includes a camera portion and a LED illumination system that operates in a boost mode and a bypass mode that are associated with a first mode and a second mode of the two or more modes of the camera device, respectively. The LED illumination system further includes a plurality of LEDs, a plurality of bypass elements, and a boost converter. The plurality of LEDs is coupled in series to form a LED string. Each bypass element is coupled in parallel with a respective group of one or more of the LEDs, and configured to bypass selectively the respective group of LEDs in the bypass mode. The boost converter is coupled to the plurality of LEDs, and configured to generate a drive voltage to drive the plurality of LEDs. The boost converter includes a boost controller that is configured to enable the boost mode in response to a boost enable signal. In the boost mode, the boost controller is electrically coupled to control the boost converter to drive the LED string by a boosted drive voltage. Alternatively, in the bypass mode, the boost controller is deactivated to allow the boost converter to drive a subset of the plurality of LEDs by a regular drive voltage that is substantially lower than the boosted drive voltage.

In accordance with another aspect of this application, a method is applied to manufacture a LED illumination system that operates in a boost mode and a bypass mode. The method includes providing a plurality of LEDs that is coupled in series to form a LED string, and providing a plurality of bypass elements. The operation of providing a plurality of bypass elements further includes coupling each of the plurality of bypass elements in parallel with a respective group of one or more of the LEDs to bypass selectively the respective group of LEDs in the bypass mode. The method further includes coupling a boost converter to the plurality of LEDs, and the boost converter is configured to generate a drive voltage to drive the plurality of LEDs. The boost converter includes a boost controller that is configured to enable the boost mode in response to a boost enable signal. In the boost mode, the boost controller is electrically coupled to control the boost converter to drive the LED string by a boosted drive voltage. In the bypass mode, the boost controller is deactivated to allow the boost converter to drive a subset of the plurality of LEDs by a regular drive voltage that is substantially lower than the boosted drive voltage.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Figure 1:
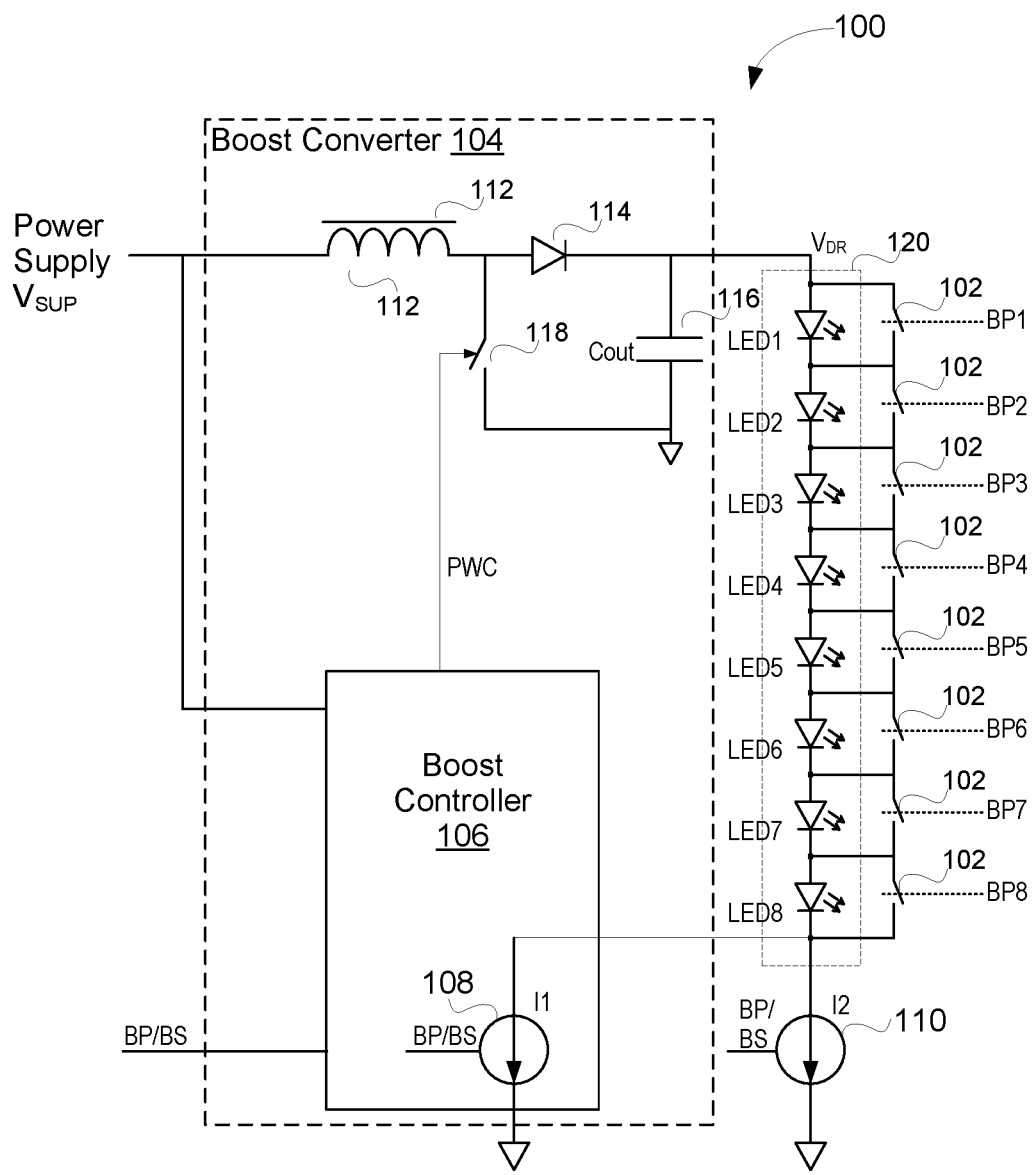
FIG. 1 is a circuit diagram illustrating a LED illumination system that operates in a boost mode and a bypass mode in accordance with some implementations.

A smart home environment is created at a venue by integrating a plurality of devices, including intelligent, multi-sensing, network-connected devices, seamlessly with each other in a local area network and/or with a central server or a cloud-computing system to provide a variety of useful smart home functions. In some implementations, the smart home environment includes one or more network-connected cameras that are configured to provide video monitoring and security in the smart home environment. In addition to video recording at the daytime, such a camera needs to operate at a night vision mode to detect any trespass or burglary activities that often happen at night when visible light illumination is unavailable. In some situations, the camera also operates at a depth imaging mode to develop a depth map related to an interior view of a room, and this depth imaging mode is preferably implemented at night when the activity level is relatively low in the room. Under some circumstances, given that visible light illumination is limited or unavailable at night, the camera therefore has to incorporate a series of infrared LEDs to illuminate the room when it operates under the night vision mode or the depth imaging mode. Such infrared LEDs are coupled differently according to the operation mode of the camera.

In accordance with various implementations of the application, a series of LEDs of an electronic device could be arranged according to different LED coupling configurations, when the electronic device operates under different modes (e.g., when a camera operates in the night vision mode and the depth imaging mode). In a specific example, eight or more infrared LEDs are coupled in series to form a LED string in a first operation mode, and only two of these eight or more infrared LEDs are coupled and involved (i.e., six of the LEDs are bypassed) in a second operation mode. When the operation voltage of each LED is assumed to be 1.5V and above, a corresponding drive voltage that drives the LEDs could vary between 12V and 4V when the electronic device operates at the two distinct operation modes. As explained below with reference to FIGS. 1-6, a LED illumination system is configured to accommodate the relatively large variation of the drive voltage caused by the variation of LED coupling configurations.

Specifically, in some implementations, a plurality of boost-bypass controls is determined according to an operation mode of an electronic device, and controls a LED illumination system to operate in one of a boost mode and a bypass mode. In the boost mode, a series of LEDs including a first number of LEDs are electrically coupled in series to form a LED string, and a boost controller is coupled to control a boost converter to drive the whole LED string by a boosted voltage. In the bypass mode, a subset of the series of LEDs is electrically coupled according to a different LED coupling configuration, and the other LEDs of the series of LEDs are bypassed. The subset of LEDs including a second number of LEDs, and the second number is substantially smaller than the first number. The boost controller is deactivated to allow the boost converter to drive the subset of LEDs by a regular drive voltage that is substantially lower than the boosted drive voltage. The boost-bypass controls are generated by a microcontroller unit (MCU), and thereby applied to control one or more of: bypassing of LEDs in the LED string, deactivating the boost controller, and selecting a current sink according to the operation mode.

FIG. 1 is a circuit diagram illustrating a LED illumination system 100 that operates in a boost mode and a bypass mode in accordance with some implementations. The LED illumination system 100 includes a plurality of LEDs (LED1-LED8), a plurality of bypass elements 102, a boost converter 104, a first current sink 108 and a second current sink 110. The boost converter 104 further includes a boost controller 106. The LED illumination system 100 further includes a plurality of boost-bypass control signals, e.g., BP1-BP8, BS and BP, which are synchronized to control the components 102-110 and enable the boost or bypass mode for the LED illumination system 100.

The plurality of LEDs is electrically coupled in series to form a LED string 120. Each of the plurality of bypass elements 102 is coupled in parallel with a respective group of one or more of the plurality of LEDs, and configured to bypass selectively the respective group of LEDs in the bypass mode. In the specific implementations as shown in FIG. 1, each of the plurality of LEDs is coupled in parallel with a respective bypass element. The respective bypass element 102 receives a LED bypass control signal, and is configured to selectively bypass the corresponding LED from the LED string 120 when the LED illumination system 100 operates in the bypass mode. In some implementations not shown in FIG. 1, one of the plurality of bypass elements is arranged in parallel with a series of two or more LEDs in the LED string 120, and selectively bypasses the series of two or more LEDs in the bypass mode. More details on the coupling configuration of the plurality of LEDs are explained below with reference to FIGS. 3A-3D. In some implementations, the plurality of LEDs is infrared LEDs.

The boost converter 104 is coupled to the plurality of LEDs, and configured to generate a drive voltage $V_{DR}$ for driving the plurality of LEDs. In some implementations, the boost converter 104 is implemented as a switch mode power supply. The boost converter 104 receives a power supply voltage $V_{SUP}$ and a pulse width control signal PWC, and generates a boosted drive voltage $V_{BDR}$. The boost drive voltage $V_{BDR}$ is substantially higher than the power supply voltage $V_{SUP}$, and varies within a fixed voltage range. The pulse width control signal PWC has a variable duty cycle, and determines the variation of the drive voltage $V_{DR}$. Specifically, in some implementations, the boost converter 104 includes an inductor 112, a diode 114, a load capacitor 116, and a switching component 118. The pulse width control signal PWC is used to control the switching component 118 to enable charging and discharging of the load capacitor 116, and thereby renders the boosted and variable drive voltage $V_{BDR}$.

The boost controller 106 of the boost converter 104 is configured to enable the boost mode in response to a boost enable signal BS of the plurality of boost-bypass control signals. In some implementations, the boost controller 106 is driven by the power supply voltage $V_{SUP}$ that drives the boost converter 104. In the boost mode, the boost enable signal BS is enabled, and the boost controller 106 is activated. The activated boost controller 106 thereby controls the boost converter 104 to drive the LED string 120 by the boosted drive voltage $V_{BDR}$. For example, when the boost converter 104 is implemented as a switch mode power supply, the boost controller 106 generates the pulse width control signal PWC and varies its duty cycle for the purposes of controlling the boost converter 104 to generate a desirable drive voltage level.

Conversely, in the bypass mode, the boost enable signal BS is disabled, and the bypass enable signal BP is enabled. The boost controller 106 is deactivated to allow the boost converter 104 to drive a subset of the plurality of LEDs by a regular drive voltage $V_{RDR}$ that is substantially lower than the boosted drive voltage $V_{BDR}$. In some implementations, in accordance with the deactivation of the boost controller 106, the pulse width control signal PWC has a null duty cycle, and the boost converter 104 generates a regular drive voltage $V_{RDR}$ substantially equal to the power supply voltage $V_{SUP}$ that drives the boost converter 104 or the entire LED illumination system 100.

The first current sink 108 and the second current sink 110 are coupled to the plurality of LEDs, and configured to provide two drive currents to drive the LEDs in the boost mode and the bypass mode, respectively. The first current sink 108 and the second current sink 110 are controlled by the boost enable signal BS and another bypass enable signal BP of the plurality of boost-bypass control signals. In some implementations, the first current sink 108 is part of the boost controller 106. In the boost mode, the first current sink is electrically coupled to the whole LED string 120, and enables a first drive current. Alternatively, in the bypass mode, the second current sink is electrically coupled to a subset of the plurality of LEDs, and enables a second drive current.

Optionally, the two drive currents provided by the first and second current sinks 108 and 110 are substantially equal. Optionally, the two drive currents are distinct. In an example, the first current sink 108 provides to the whole LED string 120 the first drive current that is substantially equal to 50 mA in the boost mode. The second current sink 110 provides to the subset of selected LEDs the second drive current that is substantially equal to 100 mA in the bypass mode. As such, the distinct drive current levels at the boost and bypass modes are associated with distinct LED coupling configurations and render distinct brightness levels for each coupled LED. When the LED illumination system 100 is applied in a camera, the boost and bypass modes could be associated with different camera operation modes, and the camera could achieve unique camera features based on the illumination configuration and brightness level associated with the boost or bypass mode of the LEDs.

In some implementations, the boost converter 104, the first current sink 108, and the second current sink 110 are integrated on an integrated circuit substrate. In some implementations, one or more of the boost converter 104, the first current sink 108, and the second current sink 110 are off-the-shelf components, and assembled on a printed circuit board substrate.

It is also noted that the LED illumination system 100 could also operate at an idle mode that is distinct from the boost mode and the bypass mode. In the idle mode, none of the plurality of LEDs is enabled to provide illumination. When the LED illumination system 100 is part of a camera, the idle mode is activated to disable infrared LED illumination during the daytime.

Figure 2A:
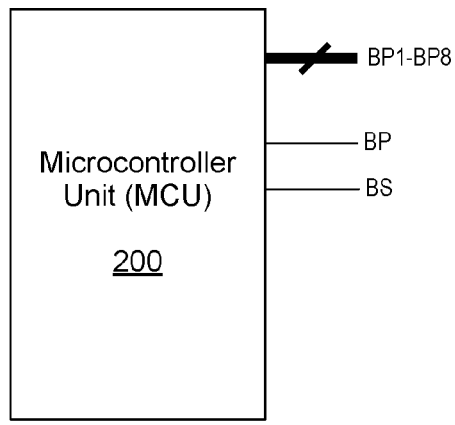
FIG. 2A is a block diagram illustrating a microcontroller unit (MCU) and its output interface in accordance with some implementations.

FIG. 2A is a block diagram illustrating a microcontroller unit (MCU) 200 and its output interface in accordance with some implementations. In some implementations, the MCU 200 is configured to generate the plurality of boost-bypass control signals in a synchronous manner for the purposes of configuring the LED illumination system 100 to operate in a boost mode or a bypass mode. Specifically, the MCU 200 is configured to generate the boost enable signal BS, and a plurality of LED bypass control signals BP1-BP8. The boost enable signal BS is applied to enable the boost controller 106 and activate the first current sink 108 in the boost mode. Each of the plurality of LED bypass controls is applied to control one of the plurality of bypass elements for bypassing the corresponding group of LEDs in the bypass mode. In some implementations, the MCU 200 is also configured to generate a bypass enable signal BP that enables the second current sink in the bypass mode. Optionally, the bypass enable signal BP is a complementary signal of the boost enable signal BS, and in some implementations, can be generated internally from the boost enable signal BS within the LED illumination system 100. Optionally, the bypass enable signal BP is enabled with a delay or an overlap with an active cycle of the bypass enable signal BS.

In some implementations, the first current sink 108 is controlled by the boost enable signal BS to enable and disable the first drive current in the boost and bypass modes, respectively. The first current sink 108 is thus enabled during the active cycles of the boost enable signal BS to provide the first drive current, and disabled from providing the first drive current during the inactive cycles of the boost enable signal BS. Alternatively, in some implementations, the first current sink 108 is controlled by both the boost enable signal BS and the bypass enable signal BP. The first current sink 108 is enabled by the boost enable signal BS to provide the first drive current, but disabled by the bypass enable signal BP from providing the first drive current. Similarly, in some implementations, the second current sink 110 is controlled by the bypass enable signal BP to enable and disable the second drive current in the bypass and boost modes, respectively. As such, the second current sink 110 is enabled during the active cycles of the bypass enable signal BP to provide the second drive current, and disabled from providing the second drive current during the inactive cycles of the bypass enable signal BP. In some implementations, the second current sink 110 is controlled by both the boost enable signal BS and the bypass enable signal BP. The second current sink 110 is enabled by the bypass enable signal BP to provide the second drive current, but disabled by the boost enable signal BS from providing the second drive current.

Figure 2B:
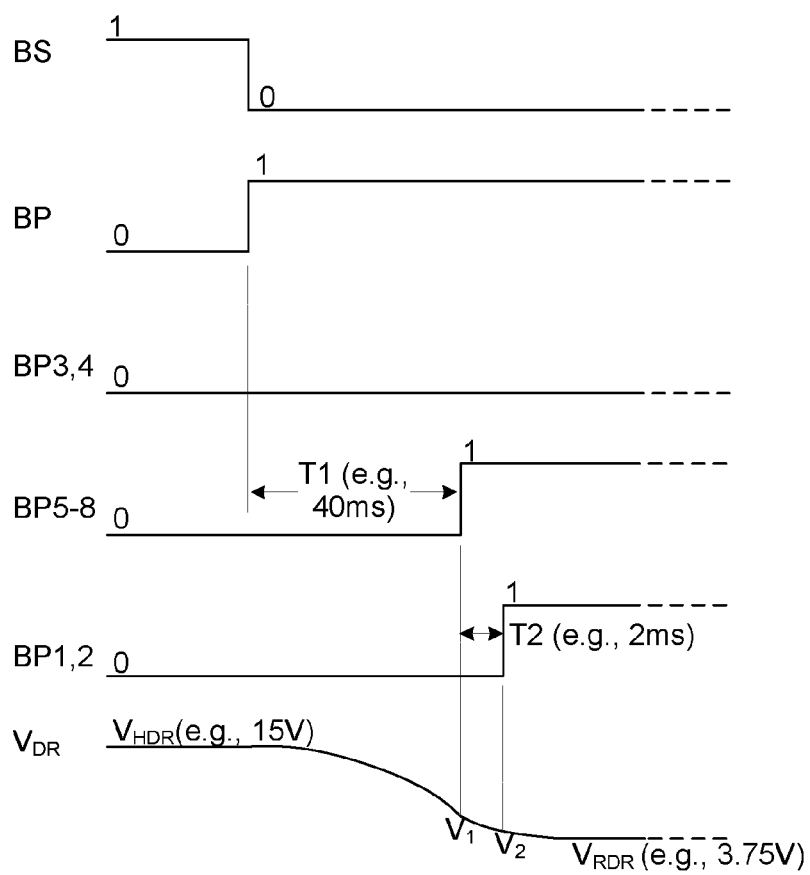
FIG. 2B is a temporal diagram of a plurality of boost-bypass control signals and a generated LED drive voltage associated with a LED illumination system in accordance with some implementations.

FIG. 2B is a temporal diagram of a plurality of boost-bypass control signals and a generated LED drive voltage associated with a LED illumination system 100 in accordance with some implementations. In some implementations, when the LED illumination system 100 transitions between the boost mode and the bypass mode, the MCU 200 introduces delay times among the plurality of boost-bypass control signals to avoid the LEDs or the current sinks from being overstressed. For example, when the LED illumination system 100 switches from the boost mode to the bypass mode, both the boost controller 106 and the first current sink 108 are deactivated, and the second current sink 110 is electrically coupled to the whole LED string 120. The MCU 200 does not enable the bypass of a subset of unselected LEDs to follow the enable signals BS and BP immediately. Rather, the MCU 200 introduces one or more delay times (e.g., T1 and T2) to delay the bypass of the unselected LEDs, such that the boost drive voltage $V_{BDR}$ does not drop on and overstress a subset of selected LEDs having a smaller number of LEDs than the whole LED string 120.

In some implementations, the one or more delay times (e.g., T1 and T2) are associated with a plurality of bypass factors, e.g., a boost control delay during which the boost controller 106 converts an input bypass enable signal to the pulse width control signal PWC for the purposes of controlling the boost converter 104. In an example, a delay time is substantially small, when the boost controller 106 introduces a substantially small or negligible boost control delay for converting the input bypass enable signal to the pulse width control signal PWC. Additionally, another example bypass factor that affects the delay times is a discharge period during which the boost converter 104 is gradually discharged for reducing the voltage level of the drive voltage at its output. A large load capacitor 116 contains more charges, and takes a longer time to discharge. As such, the delay times are associated with the length of the discharge period of the boost converter 104 which is further associated with the capacitance of its load capacitor 116.

In some implementations, the MCU 200 introduces a uniform delay time to LED bypass controls corresponding to all unselected LEDs of the LED string 120 in the bypass mode. The LED bypass controls are enabled after the delay time passes with respect to the transition edges of the boost enable signal BS and bypass enable BP. This delay time represents a length of a predetermined discharge period in which the boost drive voltage $V_{BDV}$ could drop to a tolerable drive voltage that is safe for biasing the subset of selected LEDs. Optionally, the tolerable drive voltage is substantially equal to the regular drive voltage $V_{RDR}$. Optionally, the tolerable drive voltage is larger than the regular drive voltage $V_{RDR}$, but safe for biasing the selected LEDs.

In some implementations, the MCU 200 introduces two or more delay times to the LED bypass controls corresponding to the unselected LEDs of the LED string 120. The unselected LEDs are bypassed sequentially for the purposes of reducing the number of the LEDs biased under the drive voltage sequentially. When the subset of the plurality of LEDs that are selected for illumination in the bypass mode includes a first subset of LEDs, a second subset of the plurality of LEDs are electrically coupled to the boost converter during the predetermined discharge period. The second subset of LEDs including more LEDs than the first subset of LEDs.

As shown in FIG. 2B, in some implementations, two LEDs (LED3 and LED4) need to be selected for illumination in the bypass mode. When the LED illumination system 100 switches from the boost mode to the bypass mode, the boost enable signal BS is disabled and the bypass enable BP is enabled. A first delay time $T_1$ is introduced to the LED bypass signals BP5-BP8 with respect to the enable signals BS and BP. The LED bypass signals BP5-BP8 are therefore enabled after the delay time $T_1$ to bypass a first set of unselected LEDs (LED5-LED8). An exemplary delay time $T_1$ is equal to 40 ms, and the drive voltage $V_{DR}$ drops from a boost drive voltage of 15V to a first intermediate voltage $V_1$ (e.g., 7.5V). Then, a second delay time $T_2$ is introduced to the LED bypass signals BP1 and BP2 with respect to the bypass signals BP5-BP8. The LED bypass signals BP1 and BP2 are therefore enabled to bypass a second set of unselected LEDs (LED1 and LED2). An exemplary delay time $T_2$ is equal to 2 ms, and the drive voltage $V_{DR}$ drops further to a second intermediate voltage $V_2$ (e.g., 5V) that does not overstress the selected LEDs (LED3 and LED4). Optionally, the intermediate voltage $V_2$ is substantially equal to the regular drive voltage $V_{RDR}$. Optionally, the intermediate voltage $V_2$ is higher than the regularly drive voltage $V_{RDR}$, but safe for biasing the selected LEDs.

On the other hand, in some implementations, when the LED illumination system 100 transitions from the bypass mode to the boost mode, the MCU 200 introduces delays to the boost enable signal BS and the bypass enable BP with respect to the LED bypass control signals. The LED bypass control signals are disabled for the unselected LEDs in the bypass mode, and the plurality of LEDs is electrically coupled within the LED string 120 and biased by the drive voltage generated by the boost converter 104. Then, the boost enable signal BS is enabled to activate the boost controller 108 after a predetermined delay time passes with respect to the transition edge of the boost enable signal BS. The boost converter 108 increases the drive voltage from the regular drive voltage $V_{RDR}$ to the boost drive voltage $V_{BDR}$, and the whole LED string 120 is biased under the increased drive voltage.

Under some circumstances, when the boost enable signal BS is enabled to activate the boost controller 108, the boost converter 108 increases the drive voltage from the regular drive voltage $V_{RDR}$ to the boost drive voltage $V_{BDR}$ at a relatively slow rate. The MCU 200 does not need to introduce the delay times to the boost enable signal BS and the bypass enable BP with respect to the LED bypass control signals. In some implementations, when the boost enable signal BS is enabled to activate the boost controller 108, the LED bypass control signals transitions substantially concurrently with the boost enable signal BS.

Figure 3A:
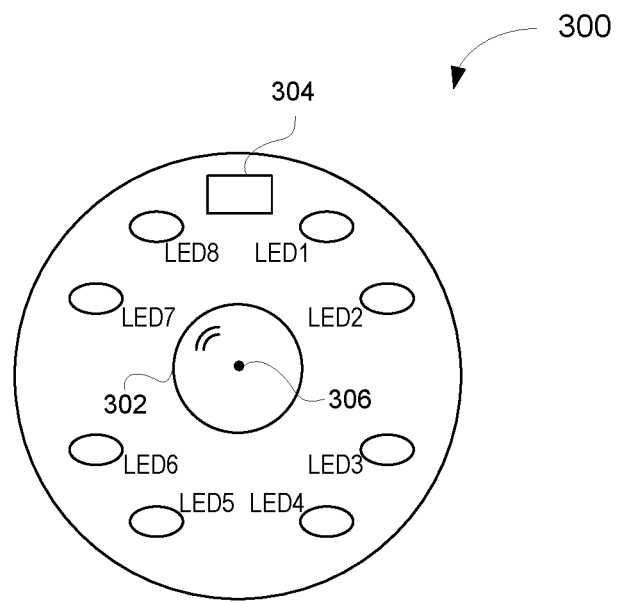
FIGS. 3A and 3B illustrate two examples of a top view of a camera module that includes a plurality of LEDs in accordance with some implementations, respectively.
Figure 3B:
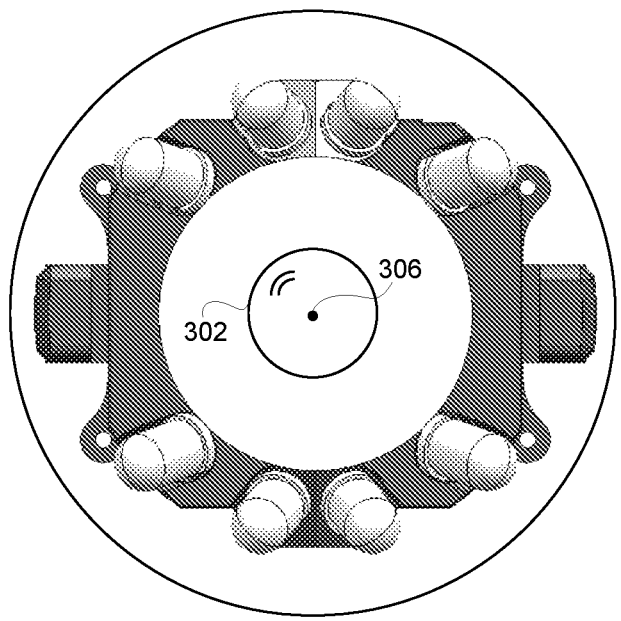

FIGS. 3A and 3B illustrate two examples of a top view of a camera module 300 that includes a plurality of LEDs in accordance with some implementations, respectively. In some implementations, the camera module 300 includes camera lens 302, high definition image sensors, a microphone, a speaker, and one or more antennas. In accordance a regular monitor mode, the camera module 300 is configured to provide video monitoring and security in a smart home environment that is illuminated by visible light sources (e.g., the sun or light bulbs). The camera module 300 captures multimedia data (video and audio data) in real-time, and communicates raw or processed multimedia data to its users via a remote surveillance server. The captured raw multimedia data are optionally processed locally in the camera module 300 or remotely within the remote surveillance server.

In some implementations, the camera module 300 includes alternative operation modes, such as a night vision mode and a depth imaging mode. Each of the alternative operation modes is associated with a respective illumination condition. For example, in the night vision mode, the camera module 300 is configured to capture activities in the smart home environment at night when no or limited visible light illumination is available. In the depth imaging mode, the camera module 300 is configured to create a depth map or image for the corresponding field of view in the smart home environment. The depth map could be subsequently used in the regular monitor mode for accurate identification of objects in the smart home environment. In some implementations, the depth image is created based on one or more images captured when part of the field of view is selectively illuminated. Therefore, in some implementations, the camera module 300 is configured to include a LED illumination system 100 as shown in FIG. 1, and use it as an internal light source to provide illumination in the smart home environment according to the respective illumination condition associated with each alternative operation mode of the camera module 300.

Specifically, in some implementations, the plurality of LEDs includes infrared LEDs. The infrared LEDs are enclosed within a dark-colored, infrared-transparent plastic cover of the camera module 300, and therefore invisible from the exterior of the camera module 300. Given that the plastic cover permits infrared light to pass through it, the camera module 204 could rely on the infrared LEDs 308 to provide illumination at night. In the night vision mode, the plurality of LEDs is powered on to illuminate the field of view with infrared light at night. The camera module 300 includes infrared image sensors that capture infrared images or video clips of the field of view.

Alternatively, in some implementations, the plurality of LEDs is a mix of infrared and visible light LEDs, including at least one infrared LED and at least one visible light LED. In the night vision mode, the at least one infrared LED of the plurality of LEDs is powered on to illuminate the field of view with infrared light.

In some implementations, as shown in FIG. 3A, the plurality of LEDs of the LED illumination system 100 is disposed on an internal assembly structure of the camera module 300, and configured to surround the camera lens 302 of the camera module 300. In this example, the plurality of LEDs includes eight LEDs that are grouped in four pairs of LEDs. The four pairs of LEDs are disposed symmetrically within four quadrants surrounding the camera lens 302. In some implementations, a mechanical or electrical component 304 is placed between two LED pairs or between two LEDs within a LED pair. In another example, the plurality of LEDs includes six LEDs. Three LEDs are disposed on one side of the camera lens 302, and three LEDs are disposed on the other side. Also, it is noted that the camera lens 302 could be surrounded by a number of LEDs having a physical arrangement that is distinct from those of the above implementations or examples (e.g., the camera lens 302 is surround by a hundred LEDs distributed uniformly in three layers surrounding the camera lens 302).

In some implementations, as shown in FIG. 3B, each LED is optionally tilted with an angle with respect to the optical axis that passes through a center 306 of the camera lens 302. Here, the optical axis is perpendicular to the lens surface at the center 306 of the camera lens 302. In some implementations, each LED is tilted away from the optical axis of the camera with the angle in the range of 20-40 degrees.

In some implementations related to the depth imaging mode, the plurality of LEDs is grouped into a number of LED sets, and each LED set is selectively powered up to illuminate respective part of a field of view associated with a venue where the camera module 300 is located. Images captured in association with these LED sets are combined to generate a depth map of the entire field of view at the venue. The camera module 300 operates in this depth imaging mode, when the camera module 300 is not busy with other operation modes (e.g., the regular monitor mode). Thus, in some implementations, the camera module 300 operates the depth imaging mode at night using infrared LED illumination without interrupting normal camera operations or disturbing regular human activities.

Figure 3C:
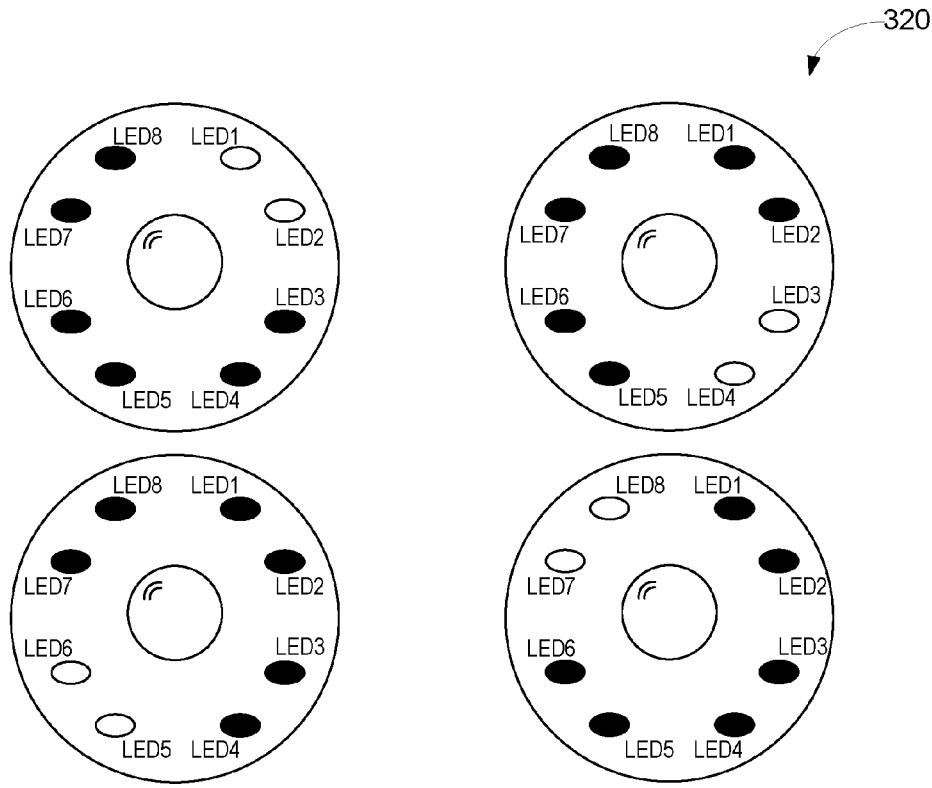
FIGS. 3C and 3D illustrate two sets of exemplary LED illumination patterns associated with a depth imaging mode of the camera shown in FIG. 3A in accordance with some implementations, respectively.
Figure 3D:
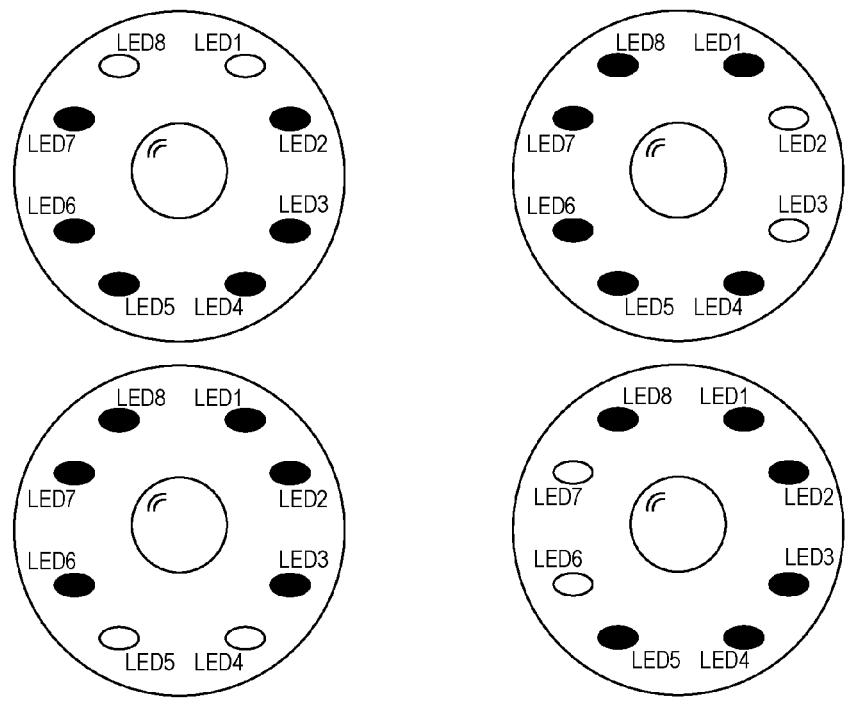

FIGS. 3C and 3D illustrate two sets of exemplary LED illumination patterns 320 and 340 associated with a depth imaging mode of the camera 300 shown in FIG. 3A in accordance with some implementations, respectively. The plurality of LEDs includes eight LEDs that are grouped in four pairs of LEDs. The four pairs of LEDs are disposed symmetrically within four quadrants surrounding the camera lens 302. The eight LEDs are electrically coupled in series to form a LED string 120, and driven in a LED illumination system 100 as shown in FIG. 1. In some implementations, the LED illumination system 100 operates at a boost mode, and the boost controller 106 is electrically coupled to control the boost converter 104 to drive the LED string 120 by a boosted drive voltage $V_{BDR}$. In accordance with that the whole LED string 120 are powered up, the plurality of LEDs illuminates the field of view at the venue where the camera module 300 is located, and the camera module 300 could operate at a night vision mode to capture images or video clips of the entire field of view.

Alternatively, in the depth imaging mode, the LED illumination system 100 powers up the four LED pairs in the four quadrants (LED1 and LED2 in quadrant I, LED3 and LED4 in quadrant II, LED5 and LED6 in quadrant III, and LED7 and LED8 in quadrant IV) separately. Each LED pair illuminates their respective part of the field of view associated with the corresponding quadrant. Such partial illumination involves subsets of selected LEDs, and is enabled by controlling the bypass elements 102 in the LED illumination system 100. For example, the bypass elements 102 for LED3-LED8 are enabled by the LED bypass controls BP3-BP8 to bypass LED3-LED8, when the LED1-LED2 pair is electrically coupled and driven to illuminate the part of the field of view associated with quadrant I.

In some implementations, the plurality of LEDs is grouped according to another coupling configuration to provide a distinct illumination pattern. For example, as shown in FIG. 3D, the plurality of LEDs is still grouped into four LED pairs, but are paired up differently: LED2 and LED3, LED4 and LED5, LED6 and LED7, and LED 8 and LED1. In the depth imaging mode, the LED illumination system 100 powers up these four LED pairs to illuminate part of the field of view that is distinct from that associated with FIG. 3A. This distinct illumination pattern of FIG. 3D is also enabled by controlling the bypass elements 102 in the LED illumination system 100. For example, the bypass elements 102 for LED1, and LED4-LED8 are enabled by the LED bypass controls BP1, and BP4-BP8 to bypass LED1, and LED4-LED8, respectively, when the LED2-LED3 pair is electrically coupled and driven to illuminate the corresponding part of the field of view.

It is noted that when a subset of the plurality of LEDs (e.g., LED1 and LED2 in FIG. 3C) is powered for illumination, the LED illumination system 100 operates in a bypass mode in association with an exemplary depth imaging mode of the camera module 300. As explained above, in the bypass mode, the boost controller 106 of the LED illumination system 100 is deactivated to allow the boost converter 104 to drive a subset of the plurality of LEDs by a regular drive voltage $V_{RDR}$ that is substantially lower than the boosted drive voltage $V_{BDR}$ associated with the boost mode. More details on the LED illumination system 100 are explained above with reference to FIGS. 1, 2A and 2B.

Figure 4:
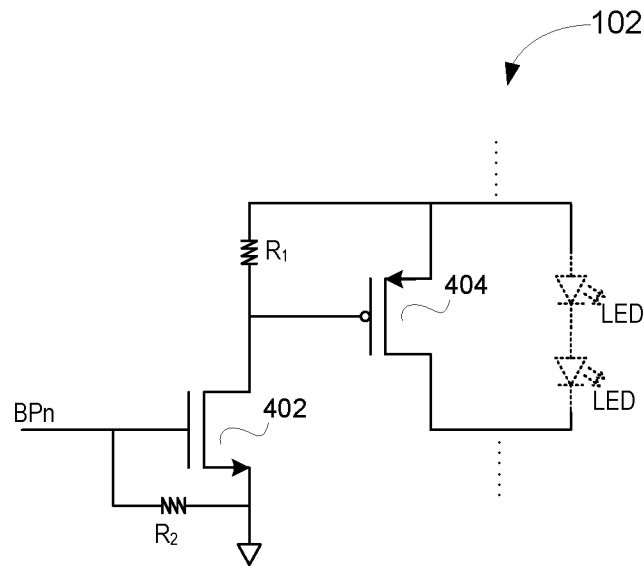
FIG. 4 is a circuit diagram illustrating an exemplary bypass element for bypassing one or more LEDs within a LED string in accordance with some implementations.

FIG. 4 is a circuit diagram illustrating an exemplary bypass element 102 for bypassing one or more LEDs within a LED string 120 in accordance with some implementations. The bypass element 102 is coupled in parallel with the one or more LEDs, and configured to bypass the one or more LEDs by shorting two end terminals thereof. The bypass element 102 includes an N-type metal-oxide-semiconductor field effect transistor (MOSFET) 402, a P-type MOSFET 404, and two resistors $R_1$ and $R_2$. The MOSFET 402 is coupled to receive a LED bypass control signal BPn, where n identifies the one or more LEDs of the LED string 120. When the LED bypass control signal BPn is enabled, the MOSFET 402 is switched off, and the MOSFET 404 is switched on. The MOSFET 404 shorts two terminals of the one or more LEDs, and thereby bypasses the one or more LEDs from the LED string 120. As such, the bypass element 102 is enabled by the corresponding LED bypass control to provide a low impedance path for bypassing the one or more LEDs.

Figure 5:
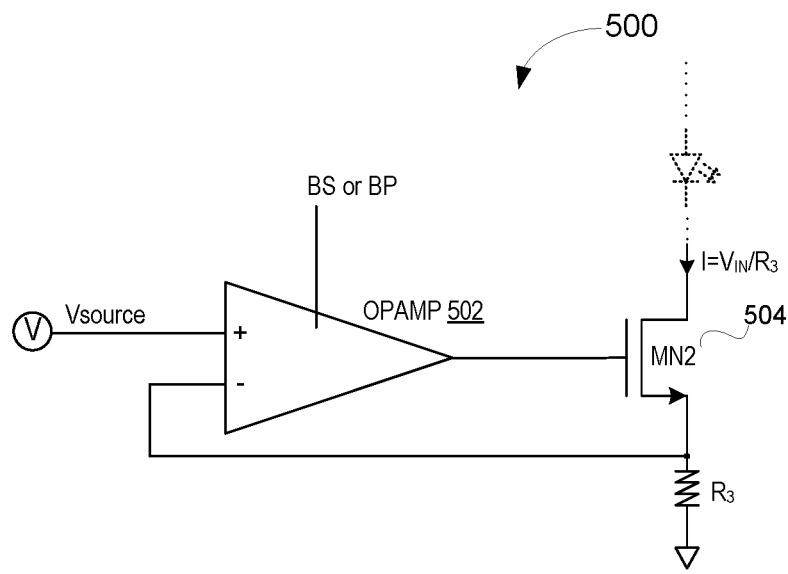
FIG. 5 is a circuit diagram illustrating a current sink that is electrically coupled in a LED illumination system in accordance with some implementations.

FIG. 5 is a circuit diagram illustrating a current sink 500 that is electrically coupled in a LED illumination system 100 in accordance with some implementations. The current sink 500 is optionally implemented as the first current sink 108 or the second current sink 110. In accordance with the operation mode of the LED illumination system 100 (the boost mode or the bypass mode), the current sink 500 is enabled by a boost enable signal BS or a bypass enable signal BP, respectively. The current sink includes a voltage source 502, an operational amplifier (OPAMP) 504, a MOSFET 506 and a resistor $R_3$. In some implementations, the voltage source 502 is a resistive voltage divider driven between a power supply $V_{SUP}$ and the ground. The voltage source 502 generates a DC voltage $V_{IN}$, and the resistor $R_I$ has resistance $R_I$. As such, the current sink provides a current level that is substantially equal to $V_{IN}/R_I$.

It is noted that FIGS. 4 and 5 merely illustrate examples of a bypass element 102 and a current sink used in the LED illumination system 100, and that implementations of the bypass element and the current sink are not limited to these examples.

Figure 6:
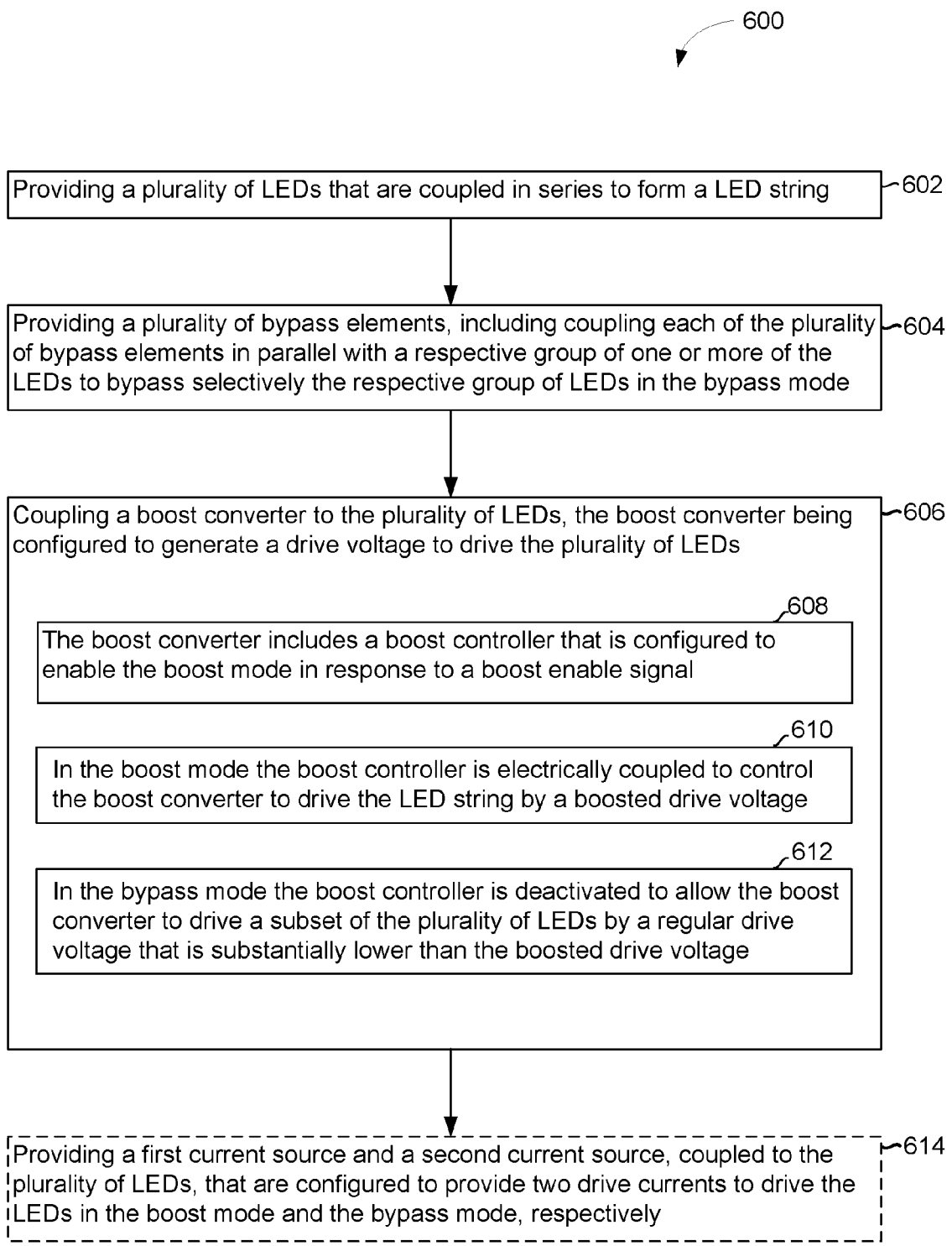
FIG. 6 is a flow diagram illustrating a method of manufacturing a LED illumination system that operates in a boost mode and a bypass mode in accordance with some implementations.

FIG. 6 is a flow diagram illustrating a method 600 of manufacturing a LED illumination system 100 that operates in a boost mode and a bypass mode in accordance with some implementations. A plurality of LEDs is provided (602), and coupled in series to form a LED string 120. In some implementations, the plurality of LEDs is disposed in a camera module to surround a camera lens, and each LED is tilted with an angle with respect to the optical axis of the camera lens. Further, in some implementations, each LED is tilted away from the optical axis of the camera with the angle in the range of 20-40 degrees. In some implementations, the plurality of LEDs includes infrared LEDs.

A plurality of bypass elements 102 are provided (604), such that each of the plurality of bypass elements 102 is coupled in parallel with a respective group of one or more of the LEDs to bypass selectively the respective group of LEDs in the bypass mode. In some implementations, each of the plurality of LEDs is coupled in parallel with a respective bypass element configurable to bypass the respective LED in the bypass mode.

A boost converter 104 is coupled (606) to the plurality of LEDs, and configured to generate a drive voltage to drive the plurality of LEDs. The boost converter 104 further includes a boost controller 106 for controlling the boost converter 104 and enabling the boost mode in response to a boost enable signal. In the boost mode, the boost controller is electrically coupled (610) to control the boost converter to drive the LED string by a boosted drive voltage, and in the bypass mode the boost controller is deactivated (612) to allow the boost converter to drive a subset of the plurality of LEDs by a regular drive voltage that is substantially lower than the boosted drive voltage. In some implementations, the voltage level of the regular drive voltage is substantially equal to that of a power supply of the LED illumination system.

In some implementations, a first current sink and a second current sink are provided (614) for coupling to the plurality of LEDs and providing two drive currents to drive the LEDs in the boost mode and the bypass mode, respectively. In some implementations, the first current sink is part of the boost controller. In the boost mode, the first current sink is electrically coupled to the whole LED string and enables a first drive current, and in the bypass mode, the second current sink is electrically coupled to the subset of the plurality of LEDs and enables a second drive current. In some implementations, the first and second drive currents are distinct.

In some implementations, the boost converter, the boost controller, and the first and second current sinks are integrated on an integrated circuit substrate.

In some implementations, the method 600 further includes providing a MCU 200 that is configured to generate the boost enable signal and a plurality of LED bypass controls. The boost enable signal is applied to control the boost controller and select one of the first and second current sinks, and each of the plurality of LED bypass controls is applied to control one of the plurality of bypass elements for bypassing the corresponding group of LEDs in the bypass mode.

In some implementations, the plurality of LEDs includes eight LEDs. In the bypass mode, six of the eight LEDs are bypassed, and two remaining LEDs are coupled in series between the boost converter and the second current sink.

In some implementations, the plurality of LEDs are grouped into four subsets of LEDs that are configured to illuminate four quadrants of a field of view, respectively, and depth information of the field of view is recovered at night time according to the variation of the field of view illuminated by these four subsets of LEDs.

In some implementations, when the LED system switches from the boost mode to the bypass mode, both the boost controller and the first current sink are deactivated, and the second current sink is electrically coupled to the whole LED string for at least a predetermined discharge period, before the subset of the plurality of LEDs are electrically coupled and biased by the regular drive voltage. Further, in some implementations, the predetermined discharge period is substantially equal to or longer than 40 msec. Alternatively, in some implementations, the subset of the plurality of LEDs include a first subset of LEDs, and a second subset of the plurality of LEDs are electrically coupled to the boost converter during the predetermined discharge period. The second subset of LEDs includes more LEDs than the first subset of LEDs.

It is noted that the LED illumination system 100 could also operate at an idle mode that is distinct from the boost mode and the bypass mode. In the idle mode, none of the plurality of LEDs is enabled to provide illumination.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first current sink could be termed a second current sink, and, similarly, a second current sink could be termed a first current sink, without departing from the scope of the various described implementations. The first current sink and the second current sink are both current sinks, but they are not the same current sink.

The terminology used in the description of the various described implementations herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A lighting emitting diode (LED) illumination system that operates in a first mode and a second mode, comprising:
a plurality of LEDs that are coupled to form an LED string;
a plurality of bypass elements, each bypass element being configured to bypass a subset of the LEDs;
a microcontroller unit that controls the plurality of bypass elements to select one of a plurality of LED subsets in the second mode, wherein at least two of the plurality of LED subsets include distinct LED members to illuminate different regions of a field of view; and
a boost converter coupled to the microcontroller and the plurality of LEDs, wherein the boost converter is configured to generate a drive voltage to drive the plurality of LEDs;
wherein in the first mode the boost converter is configured to drive the LED string by a boosted drive voltage, and in the second mode the boost converter is configured to drive the selected one of the plurality of LED subsets by a regular drive voltage that is lower than the boosted drive voltage.

2. The LED illumination system of claim 1, wherein:
a first bypass element is configured to bypass a first subset of the LEDs;
the one of the plurality of LED subsets includes a second subset of the LEDs;
the microcontroller unit is configured to generate an LED bypass control; and
the LED bypass control is applied to control the first bypass element for bypassing the first subset of LEDs in the second mode.

3. The LED illumination system of claim 1, wherein the plurality of LEDs is disposed in a camera module to surround a camera lens, and each LED is tilted with an angle with respect to the optical axis of the camera lens.

4. The LED illumination system of claim 3, wherein each LED is tilted away from the optical axis of the camera with the angle in the range of 20-40 degrees.

5. The LED illumination system of claim 1, wherein when the LED illumination system switches from the first mode to the second mode, the boost converter is deactivated, and a current sink is electrically coupled to the whole LED string for at least a predetermined discharge period, before the one of the plurality of LED subsets is electrically coupled and biased by the regular drive voltage.

6. The LED illumination system of claim 5, wherein the predetermined discharge period is substantially equal to or longer than 40 msec.

7. The LED illumination system of claim 5, wherein the one of the plurality of LED subsets includes a third subset of LEDs, and a fourth subset of the plurality of LEDs is electrically coupled to the boost converter during the predetermined discharge period, the fourth subset of LEDs including more LEDs than the third subset of LEDs.

8. A camera device that operates in two or more modes, comprising:
a camera portion; and an LED illumination system that operates in a first mode and a second mode of the two or more modes of the camera device, including:
- a plurality of LEDs that are coupled to form an LED string;
- a plurality of bypass elements, each bypass element being configured to bypass a subset of the LEDs;
- a microcontroller unit that controls the plurality of bypass elements to select one of a plurality of LED subsets in the second mode, wherein at least two of the plurality of LED subsets include distinct LED members to illuminate different regions of a field of view; and
- a boost converter coupled to the microcontroller and the plurality of LEDs, wherein the boost converter is configured to generate a drive voltage to drive the plurality of LEDs;
- wherein in the first mode the boost converter is configured to drive the LED string by a boosted drive voltage, and in the second mode the boost converter is configured to drive the selected one of the plurality of LED subsets by a regular drive voltage that is lower than the boosted drive voltage.

9. The camera device of claim 8, wherein each of the plurality of LEDs is coupled in parallel with one of the plurality of bypass elements configurable to bypass the LED in the second mode.

10. The camera device of claim 8, wherein the plurality of LEDs includes eight LEDs, and wherein in the second mode, six of the eight LEDs are bypassed, and two remaining LEDs are coupled in series between the boost converter and a current sink configured to provide a drive current to drive the two remaining LEDs in the second mode.

11. The camera device of claim 8, wherein the plurality of LEDs includes infrared LEDs.

12. The camera device of claim 8, wherein the plurality of LEDs is grouped into four subsets of LEDs that are configured to illuminate four quadrants of the field of view, respectively, and depth information of the field of view is recovered at night time according to the variation of the field of view illuminated by these four subsets of LEDs.

13. The camera device of claim 8, wherein the voltage level of the regular drive voltage is substantially equal to that of a power supply of the LED illumination system.

14. A method of manufacturing an LED illumination system that operates in a first mode and a second mode, comprising:
- providing a plurality of LEDs that are coupled to form an LED string;
- providing a plurality of bypass elements, each bypass element being configured to bypass a subset of the LEDs;
- providing a microcontroller unit that controls the plurality of bypass elements to select one of a plurality of LED subsets in the second mode, wherein at least two of the plurality of LED subsets include distinct LED members to illuminate different regions of a field of view; and
- providing a boost converter coupled to the microcontroller and the plurality of LEDs, wherein the boost converter is configured to generate a drive voltage to drive the plurality of LEDs;
- wherein in the first mode the boost converter is configured to drive the LED string by a boosted drive voltage, and in the second mode the boost converter is configured to drive the selected one of the plurality of LED subsets by a regular drive voltage that is lower than the boosted drive voltage.

15. The method of claim 14, further comprising:
- providing a first current sink and a second current sink, coupled to the plurality of LEDs, that are configured to provide two drive currents to drive the LEDs in the first mode and the second mode, respectively.

16. The method of claim 15, wherein in the first mode, the first current sink is electrically coupled to the whole LED string and enables a first drive current, and in the second mode, the second current sink is electrically coupled to the one of the plurality of LED subsets and enables a second drive current.

17. The method of claim 16, wherein the first and second drive currents are distinct.

18. The method of claim 15, wherein the first current sink is part of the boost converter.

19. The method of claim 15, wherein the boost converter and the first and second current sinks are integrated on an integrated circuit substrate.

20. The method of claim 14, where:
- a first bypass element is configured to bypass a first subset of LEDs;
- the one of the plurality of LED subsets includes a second subset of the LEDs;
- the microcontroller unit is configured to generate an LED bypass control; and
- the LED bypass control is applied to control the first bypass element for bypassing the first subset of LEDs in the second mode.

* * * * *